US012293869B2

(12) United States Patent
Dong

(10) Patent No.: US 12,293,869 B2
(45) Date of Patent: May 6, 2025

(54) MANUFACTURING METHOD FOR ANISOTROPIC BONDED MAGNET

(71) Applicant: Taiyuan Kaiyuan Intelligent Equipment Co., Ltd., Shanxi (CN)

(72) Inventor: Yongan Dong, Taiyuan (CN)

(73) Assignees: Taiyuan Kalyuan Intelligent Equipment Co., Ltd., Taiyuan (CN); Ganzhou Kaiyuan Intelligent Equipment Co., Ltd., Ganzhou (CN)

( * ) Notice: Subject to any disclaimer, the term of this patent is extended or adjusted under 35 U.S.C. 154(b) by 831 days.

(21) Appl. No.: 17/413,415

(22) PCT Filed: Nov. 22, 2019

(86) PCT No.: PCT/CN2019/120344

§ 371 (c)(1),
(2) Date: Jun. 11, 2021

(87) PCT Pub. No.: WO2020/147424

PCT Pub. Date: Jul. 23, 2020

(65) Prior Publication Data

US 2022/0059286 A1 Feb. 24, 2022

(30) Foreign Application Priority Data

Jan. 14, 2019 (CN) ......................... 201910030332.7

(51) Int. Cl.

| | |
|---|---|
| ***H01F 41/02*** | (2006.01) |
| ***B22F 1/102*** | (2022.01) |
| ***B22F 3/02*** | (2006.01) |
| ***B22F 3/24*** | (2006.01) |

(52) U.S. Cl.

CPC .......... *H01F 41/0273* (2013.01); *B22F 1/102* (2022.01); *B22F 3/02* (2013.01); *B22F 3/24* (2013.01); *H01F 41/0266* (2013.01); *B22F 2003/248* (2013.01); *B22F 2201/02* (2013.01); *B22F 2202/05* (2013.01)

(58) Field of Classification Search

CPC .. H01F 41/0273; H01F 41/0266; H01F 1/113; H01F 1/083; B22F 1/102; B22F 3/02; B22F 3/24; B22F 2003/248; B22F 2201/02; B22F 2202/05; B22F 1/10; B22F 2998/10; B22F 2999/00

See application file for complete search history.

(56) References Cited

U.S. PATENT DOCUMENTS

| | | | | |
|---|---|---|---|---|
| 2004/0113118 A1 | 6/2004 | Kamoi et al. | | |
| 2005/0145301 A1 | 7/2005 | Honkura | | |
| 2013/0069747 A1 * | 3/2013 | Honkura | ................ H01F 1/083 | 156/245 |

FOREIGN PATENT DOCUMENTS

| | | | | | |
|---|---|---|---|---|---|
| CN | 1087744 | A | | 6/1994 | |
| CN | 101499347 | A | | 8/2009 | |
| CN | 101552132 | A | | 10/2009 | |
| CN | 101556863 | A | | 10/2009 | |
| CN | 102005278 | A | | 4/2011 | |
| CN | 102324814 | A | * | 1/2012 | |
| CN | 102360918 | A | | 2/2012 | |
| CN | 102982961 | A | * | 3/2013 | |
| CN | 102982992 | A | | 3/2013 | |
| CN | 103170630 | A | | 6/2013 | |
| CN | 105655081 | A | | 6/2016 | |
| CN | 102240805 | A | | 11/2016 | |
| CN | 107359036 | A | | 11/2017 | |
| CN | 107393709 | A | | 11/2017 | |
| CN | 109698067 | A | | 4/2019 | |
| DE | 102005003247 | B4 | * | 6/2008 | ........... B29C 43/003 |
| EP | 0286324 | A1 | | 10/1988 | |
| EP | 1551040 | A1 | | 7/2005 | |
| JP | S63289913 | A | | 11/1988 | |
| JP | H0831677 | A | | 2/1996 | |
| JP | H09199363 | A | | 7/1997 | |
| WO | WO-2004105062 | A1 | * | 12/2004 | ............ H01F 1/083 |

* cited by examiner

*Primary Examiner* — Rebecca Janssen

(57) ABSTRACT

A manufacturing method for a bonded magnet, in particular a manufacturing method for an anisotropic bonded magnet. The present invention solves the problem that the existing manufacturing method under the condition of heating magnetic powders performs magnetic field orientation after a binder is melted, resulting in low production efficiency, a complicated mould structure, high process costs, thereby affecting wide use of an anisotropic bonded magnet. A manufacturing method for an anisotropic bonded magnet comprising the following steps: 1) mixing anisotropic magnetic powders and a thermosetting binder; 2) adding the mixture of step 1) to a mould cavity, performing pressure forming under an oriented magnetic field, and performing demagnetization, so as to obtain a green body; and 3) loading the green body of step 2) into a vacuum furnace for thermal curing, so as to obtain an anisotropic bonded magnet. In the present application, forming is performed in a magnetic field at normal temperature or in a cold state, avoiding magnetic powders being bonded to each other, improving the effect of magnetic field orientation, and the mould has a simple structure, is easy to operate, and provides high efficiency, thereby lowering cost.

5 Claims, No Drawings

MANUFACTURING METHOD FOR ANISOTROPIC BONDED MAGNET

The present application claims priority to Chinese Patent Application No. 201910030332.7 filed to the SIPO on Jan. 14, 2019 and entitled "MANUFACTURING METHOD FOR ANISOTROPIC BONDED MAGNET", the disclosure of which is incorporated herein by reference in its entirety.

TECHNICAL FIELD

The present application relates to a manufacturing method for a bonded magnet, in particular to a manufacturing method for an anisotropic bonded magnet.

BACKGROUND OF THE PRESENT INVENTION

Due to their characteristics of complex formed shape, high accuracy of forming dimension, free of secondary processing, high material utilization, high production efficiency, low cost, excellent magnetic performance or the like, bonded magnets have been widely used in hard disk drives, optical disk drives, office automation, consumer electronics, household appliances, automobile industry or the like. Compression forming is a main production mode for bonded magnets: a thermosetting binder and anisotropic magnetic powder are mixed and then added to a mould cavity; the mould cavity is heated to melt the thermosetting binder; an oriented magnetic field is applied, and pressure forming is performed; the mould is removed after demagnetization; and finally, thermal curing is performed. Since it is difficult to ensure that magnetic powder particles are not bonded to each other, the binder must be liquefied during all magnetic field orientations. Particularly when fine magnetic powder in 1-3 μm such as samarium-iron-nitrogen or ferrite are added for the sake of performance and cost, it is even inevitable that the magnetic powder is bonded to each other. By heating during forming in a magnetic field, the production efficiency is low, and the process cost is high, which brings obstacles to the wide use of anisotropic bonded magnets.

SUMMARY OF THE PRESENT INVENTION

The present application solves the problems of low production efficiency, complicated mould structure, high process cost and thus affecting the wide use of anisotropic bonded magnets since magnetic field orientation is performed under the condition of heating magnetic powder after a binder is melted in the existing manufacturing methods, and provides a manufacturing method for an anisotropic bonded magnet. This method employs forming in a magnetic field at room temperature.

The present application is realized by the following technical solutions. A manufacturing method for an anisotropic bonded magnet is provided, including the following steps:

1) mixing anisotropic magnetic powder and a thermosetting binder;
2) adding the mixture of the step 1) to a mould cavity, performing pressure forming under an orientated magnetic field, and performing demagnetization, so as to obtain a green body;
3) loading the green body of the step 2) into a vacuum furnace for thermal curing, so as to obtain an anisotropic bonded magnet.

For magnets that require higher performance and higher strength, a hot pressing step is added between the step 2) and the step 3), that is, the green body obtained in the step 2) is preheated in a vacuum furnace before thermal curing; After the preheating is completed, the green body is taken out from the vacuum furnace and immediately placed into a hot-pressing mould with the same preheating temperature for hot pressing. The hot pressing process is completed in a protective atmosphere of nitrogen. During the pressure forming under an oriented magnetic field in a cold state or at room temperature, the thermosetting binder is in a non-melted state, ensuring that each magnetic powder particle is independent even if the magnetic powder is very fine. That is, the magnetic powder particles are not bonded to each other. Thus, it is very easy for orientation in the magnetic field. Therefore, the magnetic field orientation effect is greatly improved, and the performance of the anisotropic bonded magnet is improved. Since forming in a magnetic field is performed at room temperature, the mould structure is simple, easy to operate and high in efficiency, thereby lowering cost.

Further, the thermosetting binder in the step 1) is thermosetting binder powder. In the prior art, the thermosetting binder is dissolved with acetone and then mixed with anisotropic magnetic powder, and the acetone is volatilized to obtain magnetic powder particles coated with the binder. On one hand, the magnetic powder particles are easily bonded to each other (even in a cold state or at room temperature), so that the magnetic field orientation effect is affected. On the other hand, it is very difficult to fill the magnetic powder particles coated with the binder into a forming mould, particularly a forming mould in a hot state, so that the difficulty in processing is caused. In the present application, by manufacturing the thermosetting binder into powder and then mixing with anisotropic magnetic powder, it is further avoided that magnetic powder particles are bonded to each other, and it is convenient for processing.

Another manufacturing method for an anisotropic bonded magnet is provided, including the following steps:

1) preparing a polyurethane binder: dissolving polyurethane into a diluent;
2) mixing the prepared polyurethane binder with anisotropic magnetic powder, and volatilizing the diluent to obtain anisotropic magnetic powder particles coated with polyurethane;
3) adding the anisotropic magnetic powder particles coated with polyurethane to a mould cavity, performing pressure forming under an oriented magnetic field, and demagnetizing to obtain a green body; and
4) curing the green body to obtain a finished product.

Polyurethane is liquid with low viscosity before curing, and each powder particle can freely rotate under the magnetic field, without affecting the magnetic field orientation effect.

In the present application, forming is performed in a magnetic field at room temperature or in a cold state, thereby avoiding magnetic powder from being bonded to each other and improving the magnetic field orientation effect. Moreover, the mould is simple in structure, easy to operate and high in efficiency, thereby lowering cost. Meanwhile, by selecting the powdery thermosetting binder and the polyurethane binder, the influence of the binder on the magnetic field orientation of the magnetic powder is further avoided. Accordingly, the efficiency of the anisotropic bonded magnet prepared by the method of the present application is greatly improved, and the cost is lowered.

DETAILED DESCRIPTION OF THE PRESENT INVENTION

Embodiment 1

A manufacturing method for an anisotropic bonded magnet is provided, including the following steps:

1) mixing anisotropic magnetic powder and a thermosetting binder;
2) adding the mixture of the step 1) to a mould cavity, performing pressure forming under an orientated magnetic field, and performing demagnetization, so as to obtain a green body; and
3) loading the green body of the step 2) into a vacuum furnace for thermal curing, so as to obtain an anisotropic bonded magnet.

In the step 1), the anisotropic magnetic powder is any one of anisotropic neodymium-iron-boron magnetic powder, anisotropic samarium-iron-nitrogen magnetic powder, anisotropic ferrite magnetic powder and anisotropic samarium-cobalt magnetic powder, or any mixture of two or more of anisotropic neodymium-iron-boron magnetic powder, anisotropic samarium-iron-nitrogen magnetic powder, anisotropic ferrite magnetic powder and anisotropic samarium-cobalt magnetic powder in any ratio. The thermosetting binder is a thermosetting resin. The binder may also be replaced with a nylon binder. The thermosetting binder is thermosetting binder powder, and the nylon binder is nylon binder powder. The binder powder has a particle size of 3 μm to 100 μm (e.g., 3 μm, 10 μm, 30 μm, 42 μm, 50 μm, 70 μm, 80 μm, 87 μm, 90 μm or 100 μm), and is added in an amount that is 2% to 4% (e.g., 2%, 2.5%, 3%, 3.7% or 4%) of the weight of the anisotropic magnetic powder.

In the step 2), the intensity of the oriented magnetic field is greater than 1.2 T, and the forming pressure is 30 MPa to 100 MPa (e.g., 30 MPa, 50 MPa, 67 MPa, 75 MPa, 80 MPa, 90 MPa or 100 MPa).

In the step 3), thermal curing is performed for 1.5 h to 3 h (e.g., 1.5 h, 2 h, 2.3 h or 3 h) at a temperature of 120° C. to 160° C. (e.g., 120° C., 130° C., 145° C., 153° C. or 160° C.). Subsequently, natural cooling or forced air cooling is performed in nitrogen.

For magnets that require higher performance and higher strength, a hot pressing step is added between the step 2) and the step 3), that is, the green body obtained in the step 2) is preheated in a vacuum furnace before thermal curing; After the preheating is completed, the green body is taken out from the vacuum furnace and immediately placed into a hot-pressing mould with the same preheating temperature for hot pressing. The hot pressing process is completed in a protective atmosphere of nitrogen. Preheating is performed for 10 min to 60 min (e.g., 10 min, 17 min, 25 min, 33 min, 46 min, 50 min or 60 min) at a temperature of 90° C. to 200° C. (e.g., 90° C., 100° C., 135° C., 150° C., 177° C., 190° C. or 200° C.) and at a vacuum degree of 1 Pa to 200 Pa (e.g., 1 Pa, 5 Pa, 10 Pa, 50 Pa, 87 Pa, 100 Pa, 150 Pa, 188 Pa or 200 Pa). Hot pressing is performed at a pressure of 300 MPa to 700 MPa (e.g., 300 MPa, 330 MPa, 450 MPa, 500 MPa, 620 MPa or 700 MPa).

If the nylon binder is used in the step 1), the green body obtained after the hot pressing step is used as a finished product.

Before the step 1), the anisotropic magnetic powder is treated as follows: a coupling agent, a surfactant and a lubricant are diluted with absolute ethanol or acetone in an amount that is 5 to 20 times of the total weight of the coupling agent, the surfactant and the lubricant to obtain a diluted solution, and the diluted solution in an amount that is 0.3% to 1.5% of the weight of the anisotropic magnetic powder is added to the anisotropic magnetic powder and then mixed uniformly. The amount of each of the coupling agent, the surfactant and the lubricant is 1% to 4.5% of the weight of the anisotropic magnetic powder. The surfactant is one of Tween-80, nonylphenol polyoxyethylene ether and triethylene glycol. The coupling agent is one of silane coupling agent (KH-570), titanate, aluminate, phosphate, zirconate and stannate. The lubricant is ethyl stearate.

Instance:

1) Powder pretreatment: anisotropic neodymium-iron-boron magnetic powder having a mass percentage of 80% and anisotropic samarium-iron-nitrogen magnetic powder having a mass percentage of 20% were mixed for 5 min in a mixer to obtain anisotropic magnetic powder. The silane coupling agent (KH-570) having a mass percentage of 1.5%, the surfactant Tween-80 having a mass percentage of 3% and the lubricant ethyl stearate having a mass percentage of 2% were diluted with absolute ethanol in an amount that was 10 times of the total weight of the silane coupling agent, the surfactant and the lubricant, then stirred uniformly, added in an amount that was 1% of the weight of the anisotropic magnetic powder to the anisotropic magnetic powder, and mixed uniformly in a mixer.
2) The anisotropic magnetic powder pretreated in 1) and epoxy resin powder in an amount that was 2% of the weight of the magnetic powder were mixed for 10 min in a cold state.
3) The mixed powder obtained in 2) was added to a mould cavity, subjected to cold pressing at a preforming pressure of 50 MPa under a magnetic field having an intensity of 1.2 T, and demagnetized to obtain a green body.
4) The green body obtained in 3) was put into a vacuum furnace for preheating for 50 min at a temperature of 90° C.
5) After the preheating is completed, the green body was taken out from the vacuum furnace and immediately put into a hot pressing mould having a temperature the same as (or near) the preheating temperature for hot pressing. The hot pressing process needs to be performed in a protective atmosphere of nitrogen at a pressure of 600 MPa.
6) The green body was transferred to a vacuum drying oven for thermal curing for 2 h at a curing temperature of 150° C. Subsequently, nitrogen was fed, and the green body was cooled to room temperature.

Thus, an anisotropic bonded magnet having a density of 6.25 g/cm$^3$, a magnetic energy product $(BH)_{Max}$ of 24.5 MGOe and a coercivity of 14 KOe was obtained.

Embodiment 2

A manufacturing method for an anisotropic bonded magnet is provided, including the following steps:

1) preparing a polyurethane binder: dissolving polyurethane into a diluent;

2) mixing the prepared polyurethane binder with anisotropic magnetic powder, and volatilizing the diluent to obtain anisotropic magnetic powder particles coated with polyurethane;
3) adding the anisotropic magnetic powder particles coated with polyurethane to a mould cavity, performing pressure forming under an oriented magnetic field, and demagnetizing to obtain a green body; and
4) curing the green body to obtain a finished product.

In the step 1), the weight ratio of the polyurethane to the diluent is 1:1.5-4.0, and a curing agent in an amount that is 7% to 9% of the weight of the polyurethane is added in the prepared polyurethane binder. For example, the curing agent is biuret polyisocyanate, and the diluent is absolute ethanol.

In the step 2), the amount of the prepared polyurethane binder is 1.5% to 2.5% of the weight of the anisotropic magnetic powder, and the anisotropic magnetic powder is any one of anisotropic neodymium-iron-boron magnetic powder, anisotropic samarium-iron-nitrogen magnetic powder, anisotropic ferrite magnetic powder and anisotropic samarium-cobalt magnetic powder, or any mixture of two or more of anisotropic neodymium-iron-boron magnetic powder, anisotropic samarium-iron-nitrogen magnetic powder, anisotropic ferrite magnetic powder and anisotropic samarium-cobalt magnetic powder in any ratio.

In the step 3), the forming pressure is 120 MPa to 700 MPa, the intensity of the oriented magnetic field is 1.5 T to 2.0 T, and the orientation time is 10 s to 20 s.

In the step 4), curing is performed for 30 min to 60 min in a drying oven at a temperature of 60° C. to 100° C.

In the step 2), before the anisotropic magnetic powder is mixed with the prepared polyurethane binder, the anisotropic magnetic powder is treated as follows: a coupling agent, a surfactant and a lubricant are diluted with absolute ethanol or acetone in an amount that is 5 to 20 times of the total weight of the coupling agent, the surfactant and the lubricant to obtain a diluted solution, and the diluted solution in an amount that is 0.3% to 1.5% of the weight of the anisotropic magnetic powder is added to the anisotropic magnetic powder and then mixed uniformly. The amount of each of the coupling agent, the surfactant and the lubricant is 1% to 4.5% of the weight of the anisotropic magnetic powder. The surfactant is one of Tween-80, nonylphenol polyoxyethylene ether and triethyleneglycol. The coupling agent is one of silane coupling agent (KH-570), titanate, aluminate, phosphate, zirconate and stannate. The lubricant is ethyl stearate.

Instance:

1) Powder pretreatment: anisotropic neodymium-iron-boron magnetic powder having a mass percentage of 80% and anisotropic samarium-iron-nitrogen magnetic powder having a mass percentage of 20% were mixed for 5 min in a mixer to obtain anisotropic magnetic powder. The coupling agent phosphate having a mass percentage of 2%, the surfactant nonylphenol polyoxyethylene ether having a mass percentage of 4% and the lubricant ethyl stearate having a mass percentage of 2% were diluted with acetone in an amount that was 15 times of the total weight of the coupling agent, the surfactant and the lubricant, then stirred uniformly, added in an amount that was 1.5% of the weight of the anisotropic magnetic powder to the anisotropic magnetic powder, and mixed uniformly in a mixer.
2) Preparation of a polyurethane binder: Polyurethane+curing agent+diluent. Polyurethane: absolute ethanol diluent=1:4. The amount of the curing agent was 8% of the weight of the polyurethane. The mixture was stirred uniformly.

3) The polyurethane binder prepared in 2) in an amount that was 2% of the weight of the anisotropic magnetic powder was added to the anisotropic magnetic powder pretreated in 1), then mixed and vacuumed to volatilize the diluent.
4) The powder obtained in 3) was added to a mould cavity, then subjected to pressure forming under a magnetic field and demagnetized. The intensity of oriented magnetic field was 1.5 T, the orientation time was 12 s, and the pressure was 600 MPa.
5) Curing was performed in a drying oven at 80° C.

Thus, an anisotropic bonded magnet having a density of 6.15 g/cm$^3$, a magnetic energy product $(BH)_{Max}$ of 22.5 MGOe and a coercivity of 15 KOe was obtained.

The invention claimed is:

1. A manufacturing method for an anisotropic bonded magnet, comprising the following steps:

1) manufacturing a thermosetting binder into powder to obtain thermosetting binder powder, and mixing anisotropic magnetic powder and the thermosetting binder powder to obtain a mixture;
2) Adding the mixture of the step 1) to a mould cavity, performing pressure forming under an orientated magnetic field, and performing demagnetization, so as to obtain a green body;

step (2a) a hot pressing step is added after step 2), that is, the green body obtained in the step 2) is preheated in a vacuum furnace before thermal curing; the green body after preheating is taken out from the vacuum furnace and immediately put into a hot-pressing mould with the same preheating temperature for hot pressing to obtain a hot pressed green body, and the hot pressing process is completed in a protective atmosphere of nitrogen; and 3) loading the hot pressed green body of the step 2a) into a vacuum furnace for thermal curing, so as to obtain an anisotropic bonded magnet, wherein during the pressure forming under an oriented magnetic field in a cold state or at room temperature, the thermosetting binder is in a non-melted state, ensuring that each magnetic powder particle is independent, and the magnetic powder particles are not bonded to each other;

wherein, before the step 1), the anisotropic magnetic powder is treated as follows: a coupling agent, a surfactant and a lubricant are diluted with absolute ethanol or acetone in an amount that is 5 to 20 times of the total weight of the coupling agent, the surfactant and the lubricant to obtain a diluted solution, and the diluted solution in an amount that is 0.3% to 1.5% of the weight of the anisotropic magnetic powder is added to the anisotropic magnetic powder and then mixed uniformly; and the amount of each of the coupling agent; the surfactant and the lubricant is 1% to 4.5% of the weight of the anisotropic magnetic powder; the surfactant is one of nonylphenol polyoxyethylene ether and triethylene glycol; the coupling agent is one of silane coupling agent, titanate, aluminate, phosphate, zirconate and stannate; and the lubricant is ethyl stearate.

2. The manufacturing method for an anisotropic bonded magnet according to claim 1, wherein, in the step 1), the anisotropic magnetic powder is any one of anisotropic neodymium-iron-boron magnetic powder, anisotropic samarium-iron-nitrogen magnetic powder, anisotropic ferrite magnetic powder and anisotropic samarium-cobalt magnetic powder, or any mixture of two or more of anisotropic neodymium-iron-boron magnetic powder, anisotropic samarium-iron-nitrogen magnetic powder, anisotropic ferrite magnetic powder and anisotropic samarium-cobalt magnetic powder in any ratio.

3. The manufacturing method for an anisotropic bonded magnet according to claim 2, wherein the binder powder has a particle size of 5 μm to 100 μm, and is added in an amount that is 2% to 4% of the weight of the anisotropic magnetic powder.

4. The manufacturing method for an anisotropic bonded magnet according to claim 1, wherein, in the step 2), the intensity of the orientated magnetic field is greater than 1.2T, and the forming pressure is 30 MPa to 100 MPa;

in the hot pressing step, preheating is performed for 10 min to 60 min at a temperature of 90° C. to 200° C. and at a vacuum degree of 1 Pa to 200 Pa, and hot pressing is performed at a pressure of 300 MPa to 700 MPa; and in the step 3), thermal curing is performed for 1.5 h to 3 h at a temperature of 120° C. to 160° C.

5. The manufacturing method for an anisotropic bonded magnet according to claim 1, wherein a) powder pretreatment is provided: anisotropic neodymium-iron-boron magnetic powder having a mass percentage of 80% and anisotropic samarium-iron-nitrogen magnetic powder having a mass percentage of 20% are mixed for 5 min in a mixer to obtain anisotropic magnetic powder; the silane coupling agent having a mass percentage of 1.5%, the surfactant having a mass percentage of 3% and the lubricant—the ethyl stearate—having a mass percentage of 2% are diluted with the absolute ethanol in an amount that is 10 times of the total weight of the silane coupling agent, the surfactant and the lubricant, then stirred uniformly, added in an amount that is 1% of the weight of the anisotropic magnetic powder to the anisotropic magnetic powder, and mixed uniformly in a mixer;

b) the anisotropic magnetic powder pretreated in a) and epoxy resin powder in an amount that is 2% of the weight of the magnetic powder are mixed for 10 min in a cold state;

c) the mixed powder obtained in b) is added to a mould cavity, subjected to cold pressing at a preforming pressure of 50 MPa under a magnetic field having an intensity of 1.2T, and demagnetized to obtain a green body;

d) the green body obtained in c) is put into a vacuum furnace for preheating for 50 min at a temperature of 90° C.;

e) after the preheating is completed, the green body in d) is taken out from the vacuum furnace and immediately put into a hot pressing mould having a temperature the same as (or near) the preheating temperature for hot pressing; the hot pressing process is performed in a protective atmosphere of nitrogen at a pressure of 600 MPa; and f) the green body in e) is transferred to a vacuum drying oven for thermal curing for 2 h at a curing temperature of 150° C.; and subsequently, nitrogen is fed, and the green body is cooled to room temperature; and an anisotropic bonded magnet having a density of 6.25 g/cm$^3$, a magnetic energy product $(BH)_{Max}$ of 24.5MGOe and a coercivity of 14KOe is obtained.

* * * * *